Sept. 13, 1938.    A. A. RUDOLPH ET AL    2,130,102
PICK-OUT GUARD
Filed Sept. 9, 1936
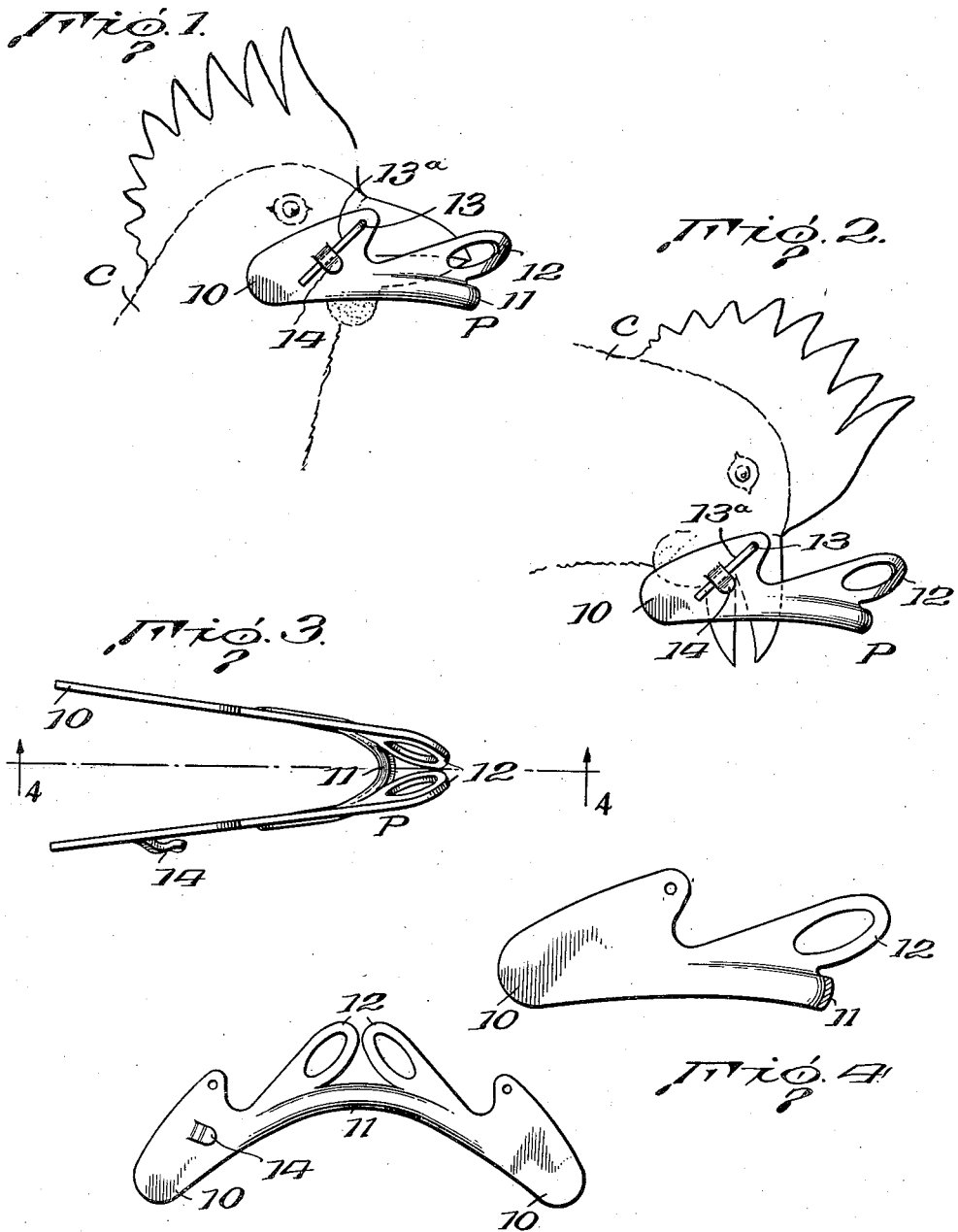

Patented Sept. 13, 1938

2,130,102

UNITED STATES PATENT OFFICE 2,130,102

PICK-OUT GUARD

Alfred A. Rudolph and Maurice L. Rudolph, Vineland, N. J.

Application September 9, 1936, Serial No. 99,986

5 Claims. (Cl. 119—97)

This invention is a poke-like guard device primarily designed to prevent cannibalism among poultry, but not limited to such use.

The existence of the practice of cannibalism among poultry is not uncommon, and is recognized by poultry raisers as a serious menace to the health of a brood and results in a material drop in production. Apparently such cannibalism is induced by improper feeding, and principally in the failure to amply supply meat and blood constituents with the food, which constituents healthy and vigorous fowls require and constantly crave.

Attempts heretofore made to reduce cannibalism have resulted in the development of two distinct types of guards or shields, one being in the form of a plate adapted to be suspended over the vent of the fowl, so that the other birds are prevented from picking out the unlaid egg or otherwise injuring the one that is equipped with the shield. The other type of preventive device is in the form of a guard which is fastened to the bill of the fowl in such manner that the mandible is prevented from closing, or else the point of the beak cannot reach any object except food that is lying on the ground or in a feed trough. Devices of the first-mentioned type now on the market are open to numerous objections. For instance droppings from the bird equipped therewith will accumulate upon the inner surface of the shield, resulting in the generation of lice, maggots, and the like, all of which are deterimental to the health of the fowl. Another objection is that such shields obviously interfere with breeding. Another objection is that the securing devices sometimes cause inflammation and infection.

The present invention belongs to the second type above mentioned, i. e., one which is attached to the beak of the fowl. One of the objects of the invention is to produce a device which may be pivotally mounted in the beak, and so constructed and arranged as to provide a poke-like portion, which will prevent the point of the beak of the fowl equipped therewith, from reaching the vent or any other portion of the anatomy of another fowl. A further object is to provide a device of the character mentioned which will not interfere with the feeding functions while the head of the fowl is lowered to feeding position.

The invention will be hereinafter fully set forth and particularly pointed out in the claims.

In the accompanying drawing:—

Figure 1 is a side elevation of the head of a fowl in normal raised position, and illustrating the means for securing the device in place. Figure 2 is a similar view illustrating the parts in positions occupied during feeding. Figure 3 is a top plan view of the "pick-out" guard detached. Figure 4 is a vertical sectional view on the line 4—4, Figure 3. Figure 5 is a view illustrating the blank from which the device is constructed.

Referring to the drawing, C designates the head of a chicken, which has been selected for illustrative purposes, and without intent to limit the use of the invention, it being understood that it is equally applicable to turkeys and other domestic fowls. Pivotally mounted in the beak is a "pick-out guard" P.

The guard P is preferably made of sheet metal by the well known die-pressing and cutting method, although not limited to this precise method of manufacture. As will be more readily understood by reference to Figure 5, the blank is of approximately arcuate form, provided with two side wings 10, connected by a cross-bar 11 which is preferably of concavo-convex cross section, and two intermediate guard members 12. The wings 10 are provided with perforations to receive a pivot member 13, preferably flexible wire, and one of the wings is provided with a struck-up ear for anchoring a downturned portion 13a of the pivot member.

In practice the blank P of Figure 5 is bent transversely into approximately U-shape as illustrated in Figure 3, the cross bar forming the bow of the U, so that the head of the fowl will exend between the wings 10 while the device is in use, and the members 12 will project upwardly from positions above the plane of the cross-bar and in such manner as to extend forwardly and overhang the same. While the device is in position, the wire 13 has been passed through the nostrils of the bird, and the end 13a has been bent downwardly and passed under the ear 14, so as to prevent relative pivotal movement of the guard P with respect to the pivot 13, but permitting pivotal movement of the guard and the pivot in the beak of the bird. It will be observed that while the parts are in the position illustrated in Figure 1, the cross-bar 11 occupies a position below the plane of the beak and slightly under the same, the wings are located so as to project rear-on both sides of the head of the bird, and the members 12 project forwardly and upwardly from the cross-bar 11 on both sides of the beak, and sufficiently far beyond the point of the beak to conact with any object which the bird may attempt to pick while the head is in the position shown in Figure 1, thereby absolutely preventing the point of the beak from reaching said object. It is to be understood, however, that in order to permit the desired free pivotal movement of the guard and yet maintain it in a normally horizontal position, as illustrated in Figure 1, the weight of the device must be equally balanced with respect to the pivot 13. The desired balancing effect is accomplished by making the wings 10 of sufficient size to provide the necessary weight to counterbalance the weight of the cross bar 11 and the guard members 12. As the head of the fowl is lowered to feeding position, the lower edges of the device maintain their normally horizontal plane, permitting the beak to be moved downwardly below the plane of the device, as shown in Figure 2.

The advantages of the invention will be readily apparent to those skilled in the art to which it belongs. For instance, it will be readily understood that the device not only acts as an absolute preventative of "pick-out" cannibalism, but it also has the advantage of preventing feather pulling and fighting. Another advantage is that the guard members are located on both sides of the beak of the fowl, in such positions as to avoid contact with the latter, so that the device is at all times free for unrestrained pivotal movement, and the body is at all times maintained in an approximately horizontal position with the guard arms projecting forwardly and upwardly. A further advantage is that the foregoing results are accomplished without interfering with the breeding functions, and the device in no way impairs the ability of the bird to feed in the ordinary and normal manner.

Having thus explained the nature of the invention and described an operative manner of constructing and using the same, although without attempting to set forth all of the forms in which it may be made, or all of the forms of its use, what is claimed is:—

1. A guard of the character described comprising a body provided with a curved cross-bar and two slightly divergent members connected therewith, each of said divergent members having a free end extended rearwardly a sufficient distance to provide a counter-balance portion, each member also having a guard portion projected upwardly from a divergent member from a position back of the cross bar and projecting in such manner as to overhang said cross bar.

2. A guard of the character described comprising a pivot member adapted to be passed transversely through the beak of a fowl, and a body member carried by the pivot member, said body member having laterally spaced guard portions projecting forwardly and upwardly therefrom and so arranged as to be located on opposite sides of said beak in positions to avoid contact with the latter during the pivotal movement of said body, said body member having portions extended rearwardly a sufficient distance to provide counter-balancing means so arranged with respect to the guard portions that the body is normally maintained in an approximately horizontal position.

3. A guard of the character described comprising a pivot member adapted to be passed transversely through the beak of a fowl, and a guard body carried by said pivot member, said body having rearwardly extended portions so positioned as to be on opposite sides of the beak of a fowl and connected at one end by a cross-bar, said body portions having guard portions projected upwardly and forwardly therefrom, the body portions and the guard members being so arranged as to be located on opposite sides of said beak in such positions as to avoid contact with the latter during pivotal movement of the body, said rearwardly extended portions being of such length as to provide counter-balancing means so arranged with respect to the body and the guard portions as to maintain the body member in a normally horizontal position at approximately all times.

4. A guard of the character described comprising a pivot member adapted to be passed transversely through the beak of a fowl, a body member including a cross bar and two side portions connected therewith, said side portions having enlarged free ends, and also having guard portions projecting upwardly therefrom to positions overhanging the cross-bar, said side portions and said guard members being so arranged as to be located on opposite sides of said beak in such positions as to avoid contact with the latter during pivotal movement, the cross-bar normally occupying a position below the plane of the beak, said counter-balancing portions being so arranged with respect to the guard portions that the body member is maintained in a normal horizontal position at approximately all times.

5. A guard of the character described comprising a pivot member adapted to be passed transversely through the beak of a fowl, a body member provided with relatively spaced side members joined by a transversely disposed cross bar located at the forward end of the body member, the forward portions of said side members having guard members projecting upwardly therefrom and also forwardly in such manner as to overhang said cross bar, the rear ends of said side members being extended a sufficient distance to provide counter-balancing means connected with said side members and so arranged with respect to the guard portions that the body member is normally maintained in horizontal position at approximately all times, said side members and said guard members being so arranged as to occupy positions on opposite sides of said beak and so located as to avoid contact with the latter, said pivot member being extended through said side members, one of said side members having an anchoring ear, said pivot member having an extension engageable with said ear.

ALFRED A. RUDOLPH.
MAURICE L. RUDOLPH.